Patented Oct. 8, 1929

1,730,857

UNITED STATES PATENT OFFICE

GERALD H. MAINS, OF WILKINSBURG, PENNSYLVANIA, ASSIGNOR TO WESTINGHOUSE ELECTRIC & MANUFACTURING COMPANY, A CORPORATION OF PENNSYLVANIA

LIQUID COATING COMPOSITION

No Drawing.    Application filed August 6, 1927. Serial No. 211,257.

This invention relates to liquid coating compositions and processes of producing them, and it has special relation to the production of varnishes containing phenolic condensation products.

An object of this invention is to prepare a liquid coating composition of the above-indicated class which shall be composed of cheap and readily obtainable ingredients and which shall possess special properties rendering them highly advantageous for general use as varnishes and especially for use in impregnating sheets of material which are subsequently molded under heat and pressure to form composite plates. Various articles useful in electrical and mechanical appliances are made from these plates by punching operations, and laminated sheets in which this improved varnish has been used as a binding means are particularly adapted for such operations in contradistinction to other phenolic laminated products which are punchable only in thin sheets and with difficulty.

Heretofore, varnishes have been prepared containing a phenolic condensation product produced by the reaction of meta-para cresol, formaldehyde and China wood oil without the presence of a catalytic or accelerating agent. It has also been proposed to use a cresylic acid for this purpose which is composed of a mixture of about ⅔ meta and para cresol and about ⅓ ortho cresol with perhaps a small percentage of the higher boiling phenols. Condensation products using the above ingredients have not proved entirely satisfactory. The reactions of the meta-para cresol have been slow and uncertain and uniform products have not been obtained. If a cresylic acid containing ortho, meta and para cresols is used, it is still more objectionable by reason of the fact that ortho cresol does not produce potentially infusible condensation products with formaldehyde and China wood oil that are reactive enough for utilization in certain types of varnishes, such as those employed for impregnating sheets that are subsequently transformed into a substantially infusible and homogeneous mass.

I have made the discovery that if the ortho-cresol is removed from the cresylic acid by distillation and from 5 to 25 per cent of xylenol is added, a satisfactory condensation product may be obtained. I prefer, however, to use a commercial coal tar acid which is inexpensive and available in large quantities. This coal tar acid contains about 75 per cent of meta and para cresol, between 20 to 25 per cent of xylenol, a small percentage of high boiling phenols and possibly a small percentage of ortho cresol and other impurities. It remains liquid at fairly low temperatures, is more reactive and considerably less expensive than meta-para cresol and is far superior to a cresylic acid containing ortho, meta and para cresols. The coal tar acid I have used for this purpose is an imported coal tar acid, the specifications of which are that not more than 2% shall distill below 200° C. and not more than 75 per cent shall distill below 215° C. The presence of xylenol in the coal tar acid accelerates the reaction, effecting the completion of the process in a shorter period, and a resin is produced that is uniform and easily controlled. By adding a mixture of meta and para cresol to the coal tar acid above described, it will be apparent that the proportions of xylenol in the resulting compositions may be easily regulated. I have found that a mixture containing from 10 to 25 per cent xylenol has proved satisfactory.

The following is an illustrative example of a method of practicing my process. I have found that the ingredients, proportions and temperatures therein stated are well adapted for this purpose and give excellent results, but it will be understood that they may be varied to a limited extent, beyond which only fair results are obtained. The amount of coal tar acid and meta-para cresol used will depend upon the composition of the coal tar acid and the purity of the meta-para cresol. The China wood oil may be varied within wide proportions without producing harmful results.

Sixty parts by weight of meta-para cresol, 194 parts by weight of a coal-tar acid containing about 75 per cent meta-para cresol and from 20 to 25 per cent xylenol, 26 parts by weight of China wood oil and 200 to 250 parts by weight of a commercial 37 per cent formaldehyde solution are mixed together. The mixture is heated for about 2 hours and 45 minutes at 90 to 95° C. under a reflux condenser and while being constantly stirred, after which the excess water and formaldehyde are distilled off under vacuum and the mixture is then boiled in a thickening kettle until a sample of the material placed in ice water forms a clear hard ball. The condensation reaction has progressed to such an extent at this stage that the total solids represent about 90% of the mixture.

The temperature of the mixture in the thickening kettle is kept between 100° and 120° C., gradually rising to the upper limit as polymerization of the condensation product takes place and as traces of water and any excess of formaldehyde and uncombined cresol or xylenol are removed. Cooling may be resorted to, if necessary, to keep the mixture below 120° C. This thickening period may require from two to four hours depending upon the amount of water removed in the vacuum process and upon the efficiency with which the fumes are withdrawn from the surface of the boiling liquid, which is accomplished by any suitable means, such as an exhaust stack.

When the end of the thickening period is reached, the reaction proceeds rapidly, so that samples must be taken at frequent intervals to determine the end point, whereupon the condensation product is discharged into a quantity of solvent which chills and dilutes it and arrests the reaction. It is sometimes found necessary to resort to artificial means to keep the solvent cool. The end point is determined by the ice water test mentioned above and when it is reached it is necessary to arrest the reaction immediately, otherwise polymerization takes place so rapidly that the resin will be transformed in a few minutes into a solid and substantially infusible mass. If the mixture is removed before the proper end point is reached the viscosity of the resin will be low and its reaction under heat and pressure when subsequently employed in molding operations will be slow and unsatisfactory.

The solvent ordinarily used consists of 75 per cent benzol and 25 per cent of an aliphatic alcohol, although these proportions may range from 60 to 90 per cent benzol, and from 10 to 40 per cent of the alcohol, which may be any one of the members of the lower series of monohydric aliphatic alcohols, such as methyl, ethyl, propyl, etc. A mixture of a cyclic hydrocarbon of the benzene series, such as toluene or xylene with any one, or a mixture of two or more, of the above-mentioned alcohols also produces a satisfactory solvent. Anhydrous alcohol and furfural may be used as solvents, but anhydrous alcohol is relatively expensive and when furfural is used as the sole solvent polymerization of the hot mixture tends to take place. When present as one of the ingredients of a mixed solvent, furfural has a tendency to make laminated sheets impregnated with the varnish and subsequently molded under heat and pressure more flexible and, in fact, serves as a plasticizing agent.

As above stated, the hot resin is discharged from the mixture directly into the solvent and after being cooled it may be used for impregnating sheet material. An example of the composition of my preferred varnish is given below:

| | Per cent |
|---|---|
| Resin | 60 |
| Benzol | 22 |
| Alcohol | 8 |
| Furfural | 10 |
| | 100 |

Instead of furfural, other plasticizing agents may be used, such as diethyl, phthalate or tricresyl phosphate and it will, of course, be understood that the ingredients of the varnish may vary within wide limitations to suit particular requirements. Potential hardening agents such as hexamethylenetetramine, paraform or furfuramid may be added to the varnish, but their presence is undesirable when the hot resin is discharged from the mixer into the solvent. The potential hardening agent may be employed in small quantities, say less than ½ per cent of the weight of the varnish, to accelerate the reaction during molding but they have the tendency to decrease the flexibility of the final product.

If sheet material impregnated with this varnish is cut to the desired size and molded in a hydraulic press under a pressure of about 1000 pounds per square inch and at a temperature of about 140 to 180° C., a substantially insoluble laminated product is formed which is slightly flexible and which may be sheared and punched readily when cold. When heated to a temperature between 100 and 140° C., the flexibility is increased and it is still more readily sheared and punched.

While I have set forth my invention by describing the specific process in which the coal tar acid, formaldehyde and China wood oil are combined to form the resin used in my varnish and have also described in detail the composition of a completed varnish, it is to be understood that my invention is not limited to the use of these exact proportions, as they may be varied considerably. Furthermore, other drying oil such as linseed oil may be substituted for China wood oil and the polymers of formaldehyde may be substituted for formaldehyde without departing from the spirit and scope of my invention. I,

I claim as my invention:

1. A liquid coating composition comprising a condensation product resulting from the reaction of formaldehyde, a drying oil and a coal tar acid containing a substantial amount of xylenol.

2. A liquid coating composition comprising a condensation product resulting from the reaction of formaldehyde, a drying oil and a coal tar acid containing a major proportion of meta and para cresol and a substantial proportion of xylenol.

3. A liquid coating composition comprising a condensation product resulting from the reaction of formaldehyde, China wood oil and a coal tar acid containing a major proportion of meta and para cresol and from 5 to 25 per cent of xylenol.

4. A liquid coating composition comprising a condensation product resulting from the reaction of formaldehyde, a drying oil and a coal tar acid containing a substantial proportion of xylenol, and a solvent for the condensation product.

5. A liquid coating composition comprising a condensation product resulting from the reaction of formaldehyde, a drying oil and a coal tar acid containing a substantial amount of xylenol, and a solvent containing an aliphatic alcohol, a cyclic hydrocarbon and furfural.

6. A liquid coating composition comprising a condensation product resulting from the reaction of formaldehyde, China wood oil and a coal tar acid containing a major portion of meta and para cresol and a substantial amount of xylenol, and a solvent containing an aliphatic alcohol and a cyclic hydrocarbon.

7. A liquid coating composition comprising a condensation product resulting from the reaction of formaldehyde, China wood oil and a coal tar acid containing a substantial amount of xylenol, and a solvent containing a plasticizer.

8. A liquid coating composition comprising a condensation product formed by the reaction of formaldehyde, a drying oil and a coal tar acid containing a substantial amount of xylenol, a potential hardening agent and a solvent for the condensation product.

9. A liquid coating composition comprising a potentially infusible condensation product formed by the reaction of formaldehyde, a drying oil and a coal tar acid containing a substantial amount of xylenol, a substance containing an active methylene group, and a solvent for the condensation product.

10. A liquid coating composition comprising a potentially infusible condensation product resulting from the reaction of formaldehyde, a drying oil and a coal tar acid containing a major portion of meta and para cresol and a substantial proportion of xylenol, a solvent for the condensation product, and a plasticizer.

11. The process of preparing a liquid coating composition which comprises heating a mixture of formaldehyde, a drying oil and a coal tar acid containing a substantial proportion of xylenol.

12. A process of preparing a liquid coating composition which comprises heating a mixture of formaldehyde, China wood oil and a coal tar acid containing a substantial amount of xylenol.

13. The process of preparing a liquid coating composition which comprises heating a mixture of formaldehyde, a drying oil and a coal tar acid containing a substantial amount of xylenol under a reflux condenser and then distilling off the excess water and uncombined acid and formaldehyde.

14. The process of preparing a liquid coating composition which comprises heating a mixture of formaldehyde, a drying oil and a coal tar acid containing a substantial amount of xylenol under a condenser, distilling off the excess water and uncombined acid and formaldehyde, and boiling in a thickening kettle at a temperature between 100° to 120° C. until a sample of the material placed in ice water forms a clear hard ball.

15. The process of preparing a liquid coating composition which comprises heating a mixture of formaldehyde, a drying oil and a coal tar acid containing a substantial amount of xylenol under a condenser, distilling off the excess water and uncombined acid and formaldehyde, boiling in a thickening kettle at a temperature between 100° and 120° centigrade until a sample of the material placed in ice water forms a clear hard ball, and discharging the resin into a solvent.

16. The process of preparing a liquid coating composition which comprises forming a fusible condensation product from formaldehyde, a drying oil and a coal tar acid containing a substantial amount of xylenol, dissolving the resulting mixture in a solvent and then adding a potential hardening agent.

17. A process of preparing a liquid coating composition which comprises forming a fusible condensation product from formaldehyde, a drying oil and a coal tar acid containing a substantial amount of xylenol, and dissolving the product in a solvent containing a plasticizing agent.

18. The process of preparing a liquid coating composition which comprises forming a fusible condensation product from formaldehyde, a drying oil and a coal tar acid containing a major portion of meta and para cresol and a substantial amount of xylenol, and dissolving the product in a solvent containing furfural.

19. The process of preparing a liquid coating composition which comprises forming a fusible condensation product from formaldehyde, a drying oil and a coal tar acid containing a major portion of meta and para cresol and a substantial amount of xylenol, and dissolving the product in a solvent containing an aliphatic alcohol, a cyclic hydrocarbon and furfural.

20. The process of preparing a liquid coating composition which comprises forming a fusible condensation product from formaldehyde, a drying oil and a coal tar acid containing a major portion of meta and para cresol and about 20 to 25 per cent xylenol and dissolving the product in a solvent containing an aliphatic alcohol and a benzenoid hydrocarbon.

21. A liquid coating composition comprising a condensation product resulting from the reaction of a methylene substance, a drying oil and a coal-tar acid containing a substantial amount of xylenol.

22. A liquid coating composition comprising a condensation product resulting from the reaction of formaldehyde, China wood oil and a mixture of meta-para cresol and a coal-tar acid containing about 75% meta-para cresol and 20 to 25% xylenol.

23. A liquid coating composition comprising a condensation product resulting from the reaction of formaldehyde, China wood oil and a mixture of meta-para cresol and a coal tar acid containing a substantial amount of xylenol, and which is substantially free from ortho cresol.

24. A liquid coating composition comprising a condensation product resulting from the reaction of formaldehyde, China wood oil and a mixture of meta-para cresol and a coal-tar acid which is composed essentially of meta-para cresol and xylenol, and which contains not more than 2% of ortho cresol.

25. A liquid coating composition comprising a condensation product resulting from the reaction of formaldehyde, China wood oil and a mixture of meta-para cresol and a coal-tar acid containing a substantial amount of xylenol, not more than 2% of said coal-tar acid being distillable below 200° C. and not more than 75% being distillable below 215° C.

In testimony whereof, I have hereunto subscribed my name this 3rd day of August 1927.

GERALD H. MAINS.